(12) United States Patent
Kölker et al.

(10) Patent No.: US 6,302,635 B1
(45) Date of Patent: Oct. 16, 2001

(54) TRANSSHIPMENT SYSTEM (75) Inventors: Carl Wilhelm Kölker, Baar (CH); Bernd Thiele, Wuppertal (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/465,022

(22) Filed: Dec. 16, 1999

Related U.S. Application Data (63) Continuation of application No. PCT/EP97/03669, filed on Jul. 10, 1997.

(30) Foreign Application Priority Data

Jun. 22, 1997 (EP) .................................................. 97110204

(51) Int. Cl.[7] .............................. B61D 47/00; B60P 1/64; B65G 67/02
(52) U.S. Cl. ...................... 414/341; 414/339; 414/333; 414/495
(58) Field of Search ..................................... 414/341, 339, 414/495, 333

(56) References Cited

U.S. PATENT DOCUMENTS

| | | |
|---|---|---|
| 2,832,481 * | 4/1958 | Stevens et al. ............... 414/341 X |
| 2,996,206 | 8/1961 | McKee . |
| 4,302,022 * | 11/1981 | Schoeffler et al. ............... 414/495 X |
| 4,425,064 | 1/1984 | Walda et al. . |
| 4,861,220 * | 8/1989 | Smith .................................. 414/495 |

FOREIGN PATENT DOCUMENTS

| | | |
|---|---|---|
| 117668 | 12/1926 | (CH) . |
| 3313211 | 10/1984 | (DE) . |
| 4222956 | 1/1994 | (DE) . |
| 273354 | 7/1988 | (EP) . |
| 447574 | 3/1990 | (EP) . |
| 264 9373 | 1/1991 | (FR) . |

\* cited by examiner

*Primary Examiner*—Steven A. Bratlie
(74) *Attorney, Agent, or Firm*—Altera Law Group LLC

(57) ABSTRACT

In a transshipment system for combined transport, a dropbed freight car, with a frame mounted on bogies and at least one onboard or stationary mounting which can be moved transverse to the longitudinal axis of the freight car, is used for a transporting unit. The mounting moves under the transporting unit, for example a semitrailer, brings it onto the freight car and lower it down there.

20 Claims, 8 Drawing Sheets

TRANSSHIPMENT SYSTEM

This application is a continuation of Ser. No. PCT/EP97/03669 Jul. 10.1997.

TECHNICAL FIELD

The invention relates to a transshipment system with a drop-bed freight car for combined road and rail transport, for example with semitrailers.

PRIOR ART

From a very early time, the amount of freight traffic, increasing from year to year at high rates of growth, gave rise to the idea of bringing together the advantages of road transport and rail transport in a combined road/rail system and, in the system, to leave the local area, or the pre- and post-carriage, to road transport as a delivery service. This system has proven successful as such, but currently undertakes only a small proportion of the volume of traffic, which however requires considerable expansion in view of the forecast development in the volume of freight.

In view of the high investment and operating costs as well as the large space requirement of the transshipment terminals, this entails considerable problems. In addition, there is the great amount of time needed for loading and unloading as well as marshaling the freight cars and the delivery vehicles. The time gained in rail transport, which in any case only becomes noticeable over relatively long distances, is consequently largely lost in view of the low transshipment rates of the terminals. This applies especially to vertical transshipment, which requires expensive crane systems to allow an entire train length to be run along by one or more gantry cranes and to make it possible for the freight containers or transport units to be transported transversely over about 25 m. Since each crane can transport only one unit at a time and the transport between truck and freight car takes several minutes, the transshipment rate at the terminal depends on the number of cranes available.

In order to load or unload a freight train with about 30 freight cars and, correspondingly, 60 freight containers with one crane, several hours are required, during which the rolling stock, in particular the freight cars, are not performing any transportation service. Added to this is the fact that the failure of a crane, even if only temporary, upsets the scheduled timetable in view of the high frequency of railbound passenger and freight services; this sets very narrow constraints on the expansion of combined transport, in particular with the greatly increasing trend toward just-in-time deliveries.

To avoid crane transport, German Laid-open Patent Application 33 13 211 proposes the use of a low-level freight car, which is provided with a laterally displaceable loading platform. The loading platform can be horizontally extended, perpendicular to the longitudinal axis of the freight car, and thus allows truck-trailer combinations to run on parallel to the track. A major disadvantage of this system is that, when they are extended at the same time, the loading platforms lie one behind the other at intervals of about 5 m and therefore do not allow simultaneous loading. Accordingly, as when loading freight cars by means of an end ramp, the truck-trailer combinations must drive from one side over the individual loading platforms one after the other, until they reach the loading platform assigned to them. Another possibility is for the loading platforms in each case to be extended individually to the side and loaded one after the other. Simultaneous loading and unloading of all the freight cars is not possible in the case of this system.

Added to this is the fact that this system is truck-dependent and is accordingly not suited for the transportation of unpowered semitrailers and containers. Accordingly, when loading the freight cars—unlike in the case of container transport—no transporting capacity becomes available for road transport. Rather, the complete truck-trailer combination continues as before to cover the full distance between the outbound station and the inbound station; this is, however, accomplished in the local area by road and in the long-distance area on the railroad freight car or by rail.

This disadvantage is overcome by a drop-bed freight car known from European Patent 0 023 372, with the aid of a centrally rotatable loading platform, which allows simultaneous loading and unloading from the side or toward the side. However, in the case of a freight train with 30 cars, this requires a total of 60 tractor units each with a driver, 30 for bringing the delivered semitrailers down from the laterally swung-out loading platforms on one side of the train and 30 for loading the loading platforms from the other side. Therefore, the loading and unloading of the freight cars, taking only a few minutes, requires a high expenditure in terms of machinery and personnel. The costs involved are probably the reason why this system has also not been widely adopted.

The invention is thus based on the problem of providing a transshipment system which not only allows an entire train to be loaded and unloaded within just a few minutes without cranes and without the use of expensive tractor units, but with equally low expenditure also allows the loading and unloading of an individual freight car or a number of freight cars.

SUMMARY OF THE INVENTION

The solution to this problem is based on the idea of using for the loading/unloading of the transporting units onboard or stationary mountings which move under the transporting units, preferably semitrailers, pick them up and set them down on the freight car.

The invention specifically comprises a transshipment system with a drop-bed freight car comprising a frame mounted on bogies, preferably with three axles, and onboard or stationary underrunning mountings, which can be moved transverse to the longitudinal axis of the frame and are, for example, in the form of a crawler undercarriage. Such mountings can be arranged in the region of the frame upsweeps of the freight car and, under the control of an onboard, preferably central system from the locomotive, can be moved under the transporting units set up parallel to the tracks, for example semitrailers or interchangeable bodies with an interchangeable undercarriage. In order to pick up semitrailers, for example, all that is necessary is for mounting lifting gear to be extended, which raises the semitrailer. The mountings then need only cover the short distance from the ramp onto the freight car, in order to set the semitrailer down there in such a way that its wheels enter a recess in the freight car.

The transverse movement of the mountings, the extending of the lifting gear, the necessary raising of the axles of the semitrailer with regard to the ground clearance necessary for the transporting to the freight car as well as the retracting of the mountings, the setting down of the semitrailers onto the freight cars and the locking 40 of the mountings for rail transport, occurs simultaneously and can be controlled centrally and synchronously with the aid of limit switches.

If bodies with an interchangeable undercarriage are concerned, the undercarriage is left on the loading road and only the body is set down on the drop-bed freight car. Otherwise, transshipment proceeds in exactly the same way as in the case of a semitrailer.

The transporting system according to the invention requires, as additional expenditure, essentially only the onboard or stationary mountings, for example the crawler undercarriages mentioned, and at least one narrow loading road or ramp alongside the track. The space required for the loading road or ramp is extremely small, because the semitrailers or transporting units only need to be set down in a row one behind the other at given intervals and then the tractor units are immediately free to pick up a new semitrailer, for example one which has just been offloaded.

By using, for example, slabs of a large surface area on leveled underlying ground, the loading roads and ramps can be set up with minimal space and cost requirements, making it possible everywhere. This allows the terminals to be arranged with widespread coverage at short intervals of 200 km and, in view of the high transshipment rate, cost-effective rail transport even over relatively short distances, but also transshipment of individual transporting units (interchangeable bodies or semitrailers with a fixed body or containers) from one freight train to another.

To position semitrailers exactly for being moved by the mountings, the ramp may be provided with dish-shaped depressions for the wheels of the tractor unit and of the semitrailer. Furthermore, the drop-bed freight car may be provided in the region of at least one upsweep with a supporting plate for the setting down of the transporting unit. In this case, there may be a pin receptacle in the supporting plate, for example for the king pin of a semitrailer, ensuring positionally correct setting down on the freight car or its supporting plate or supporting plates. The pin can be locked in the supporting plate.

Combined transport with the transshipment system according to the invention specifically proceeds as follows:

The transporting units to be loaded are brought by customary tractor units onto a loading road into a given waiting position, expediently provided with guides in the form of bottom recesses, and at the same time are set up in a row one behind the other at a distance of about 1 m from the edge of the loading road in a way corresponding to the location of the drop-bed freight cars. When a semitrailer or a transporting unit with an interchangeable undercarriage is set down like this in a customary way, the tractor unit concerned is available for the road transport of another semitrailer or another transporting unit.

As soon as a freight train, for example with empty drop-bed freight cars, has reached its given stopping position, all the mountings move, preferably under central control from the locomotive, simultaneously from their waiting position on the freight cars or the loading road until they are in the given takeover position, for example under the semitrailers arranged in a row, they take over said semitrailers and move together into the transporting position on the freight cars, where they set the semitrailers down, locking them at the same time. This completes the loading operation and the ramp is available for setting up the next semitrailers.

Instead of the previously described loading of empty drop-bed freight cars, it goes without saying that freight cars provided with semitrailers can also be unloaded to one side with the aid of the mountings and loaded from the other side of the track with the aid of the same mountings. This is not only possible for all the freight cars simultaneously; individual freight cars can also be loaded and unloaded, in order for example to load individual semitrailers onto a different freight train in the same way as when making a connection. This freight train is preferably located on the other side of a ramp, so that its mountings can move the semitrailers where the mountings of the incoming freight train has set them down. This requires a ramp width of only about 4 m, without any technical installations.

With appropriate control, the transshipment system according to the invention, with the drop-bed freight cars, operates without needing scarcely any personnel; however, a terminal supervisor is required to take care of emergencies.

When using the mountings, loading the semitrailers requires raising of the trailer axles and swinging up of the rear underride guard, in order to create the ground clearance necessary for the transporting to the freight car and to prevent the underride guard colliding with the upsweep of a freight car during loading. This can be readily integrated into the system and accomplished fully automatically; for example, with the aid of a toothed rack, arranged on the rear of the trailer, and a double pinion for transferring the rack motion to a horizontal push rod, which is mounted in the trailer frame and can be connected on the one hand by means of cables passed over rollers to the trailer axles and on the other hand via a link to a crank of the underride guard. The vertical toothed rack is automatically actuated by one of the two mountings per trailer when the latter is taken over from the ramp and brings about a raising of the trailer axles, by means of the cables, and a swinging up of the underride guard, by means of the crank.

BRIEF DESCRIPTION OF THE DRAWING

The invention is explained in more detail below on the basis of an exemplary embodiment represented in the drawing, in which.

WAYS OF IMPLEMENTING THE INVENTION

Figure 1:
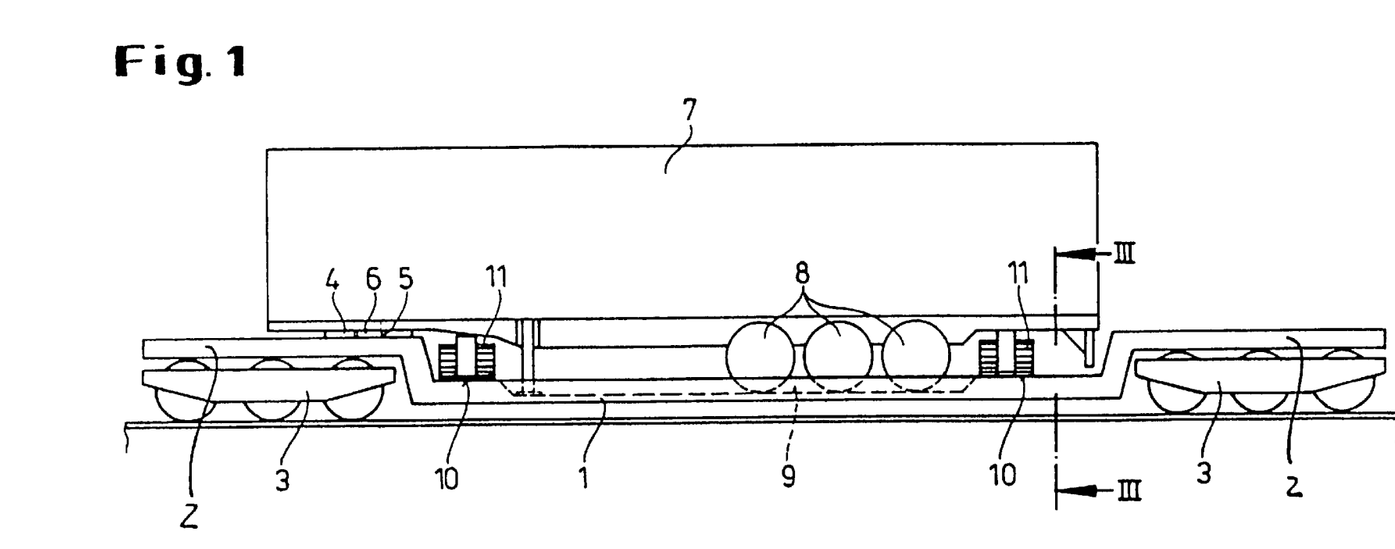
FIG. 1 shows a drop-bed freight car in side view.
Figure 2:
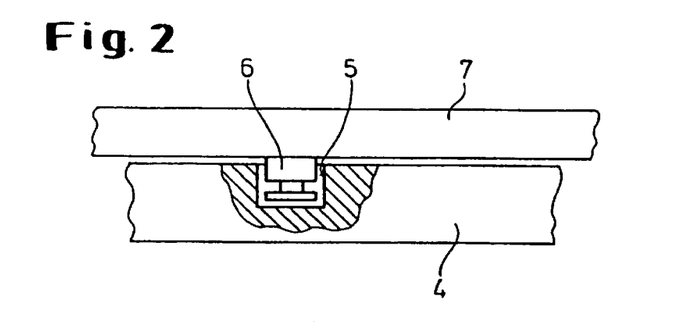
FIG. 2 shows a supporting plate with a receptacle for the king pin of a semitrailer.
Figure 3:
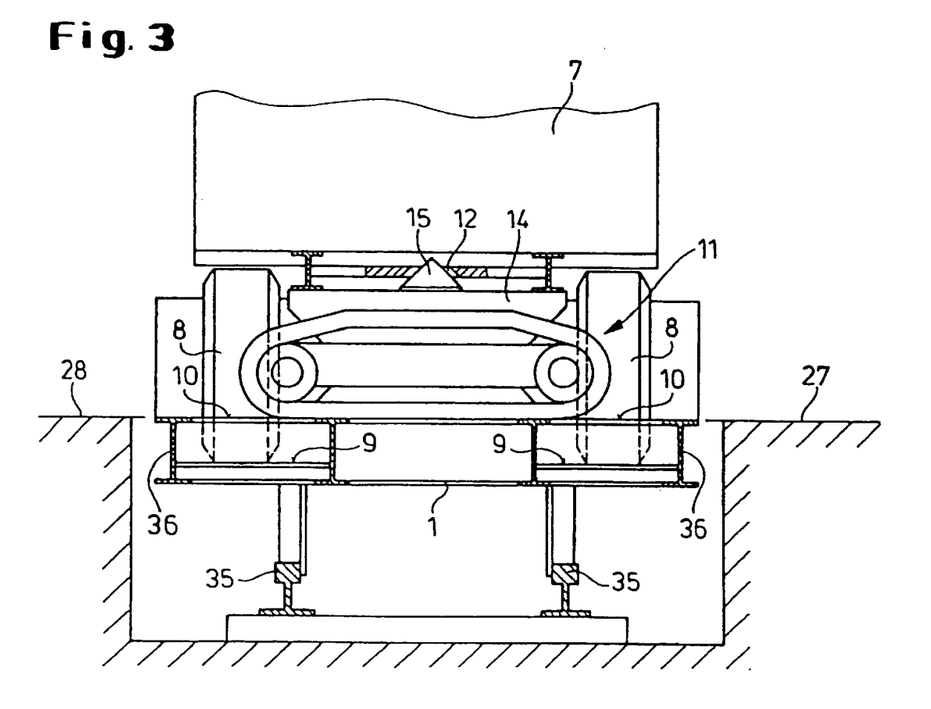
FIG. 3 shows a section according to the line III—III in FIG. 1.

The drop-bed freight car according to the invention comprises a frame 1, which is mounted at its ends by means of upsweeps 2 in a customary way on in each case a three-axle undercarriage 3. The frame has at the front end a supporting plate 4 with a pin receptacle 5, in which the king pin 6 of a semitrailer 7 engages. This semitrailer rests on the supporting plate 4 and is supported by means of its wheels 8 on the bottom of a recess 9 in the frame 1 (FIG. 3).

Figure 4:
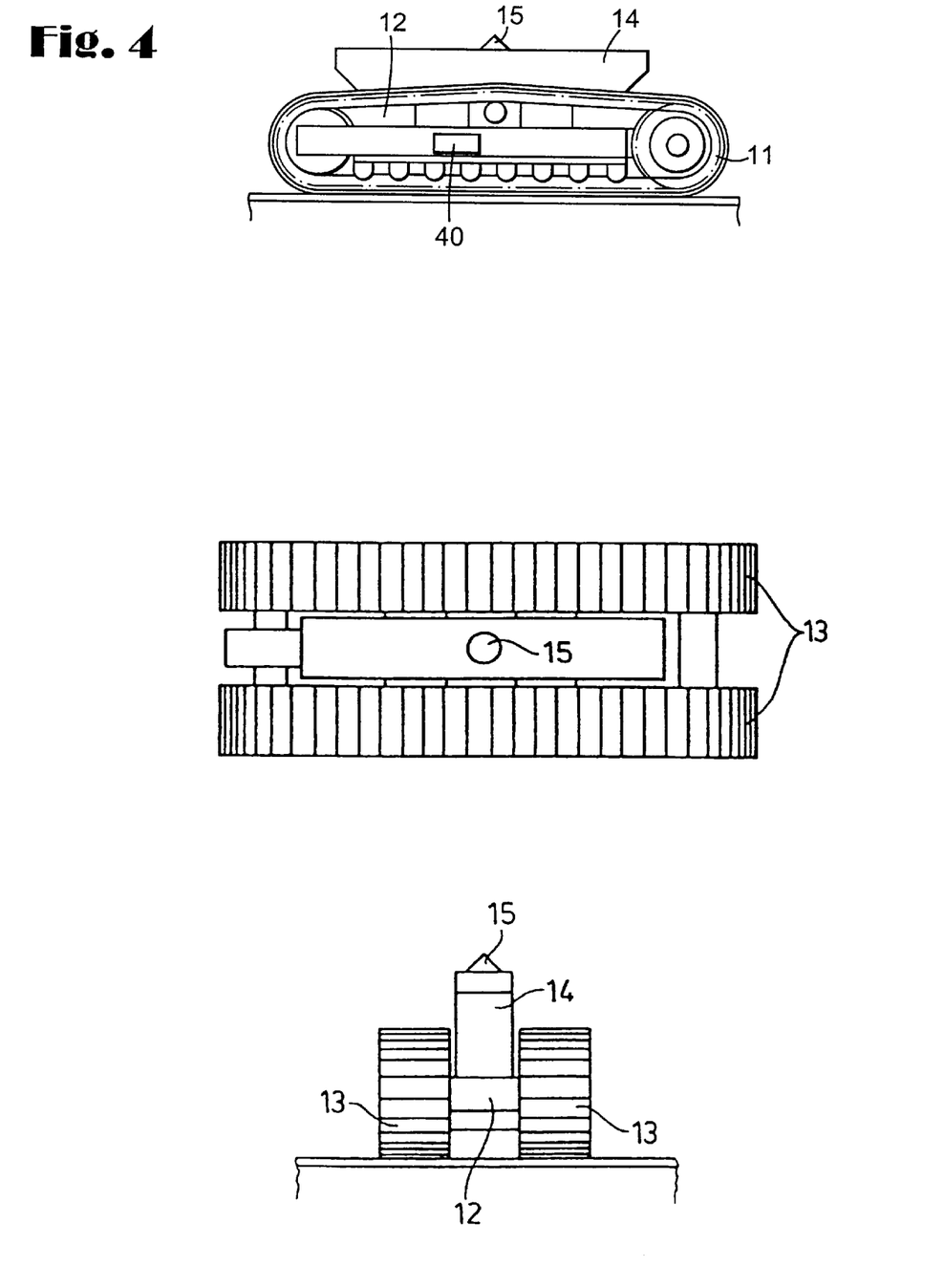
FIG. 4 shows various views of a crawler undercarriage.
Figure 7:
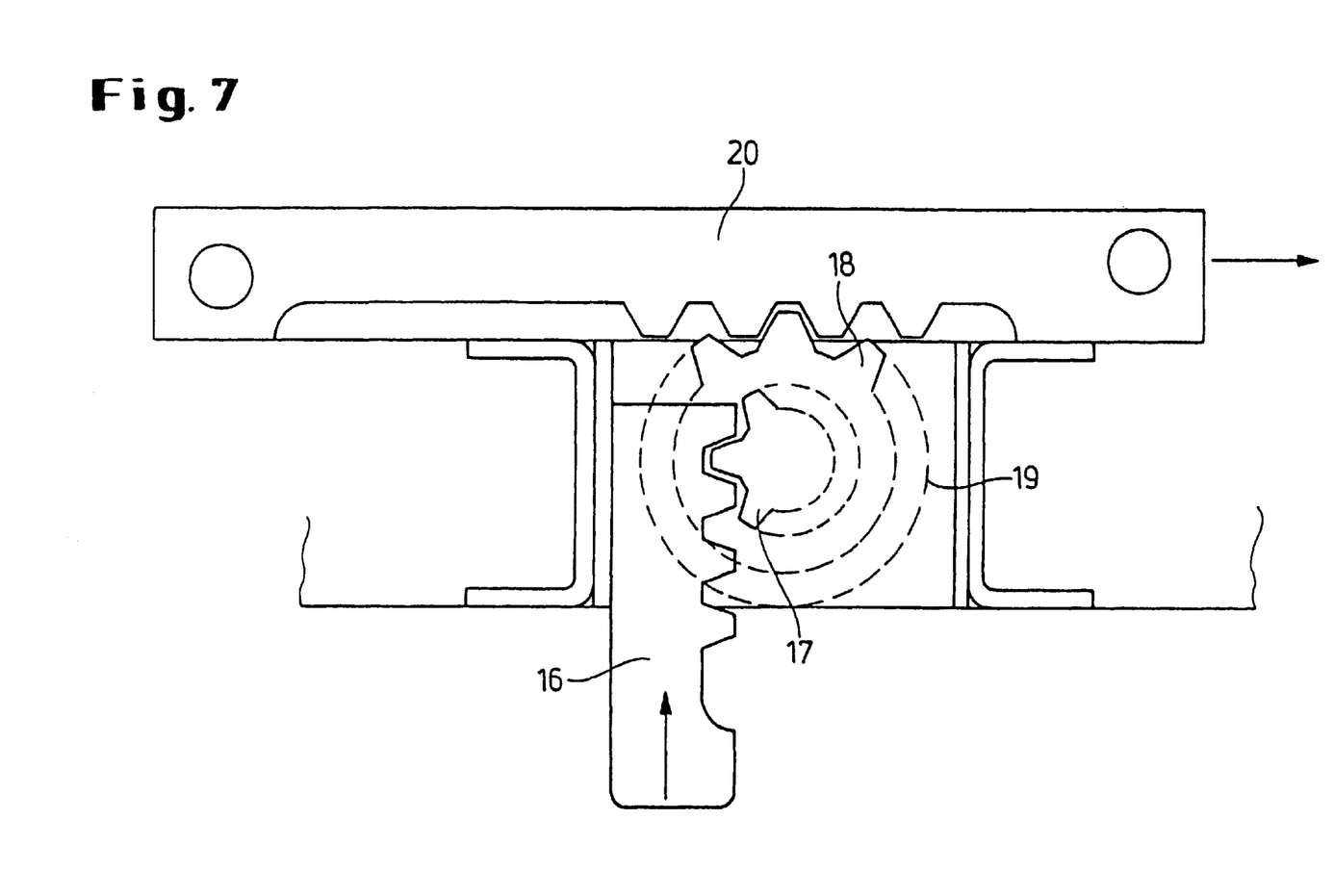
FIG. 7 shows an enlarged representation of the device for raising the trailer axles and for swinging up the rear underride guard.

Between the freight car frame 1 and the semitrailer 7 there are, on a standing area 10 in each case, two self-propelled mountings or crawler undercarriages 11 with driven chains 13 and a lifting bar 14. The lifting bar is centrally provided with a centering cone 15, which engages in a complementary opening 12 on the underside of the semitrailer 7 and, as soon as the crawler undercarriage 11 is located in the envisaged takeover position under the rear of the trailer, comes up against a vertical toothed rack 16 during the takeover of the semitrailer, which rack meshes with the small diameter stage 17 of a double pinion 18, while the large diameter stage 19 of the latter meshes with the toothing of a horizontal push rod 20. This push rod is connected to the left side by means of a cable line 22 passed over rollers 21 to the axles 23 of the trailer wheels 8. To the other side, the horizontal pushed rod 20 acts via a link 24 on a crank 25 of an underride guard 26 mounted on the rear of the trailer in such a way that it can be swung.

Figure 5:
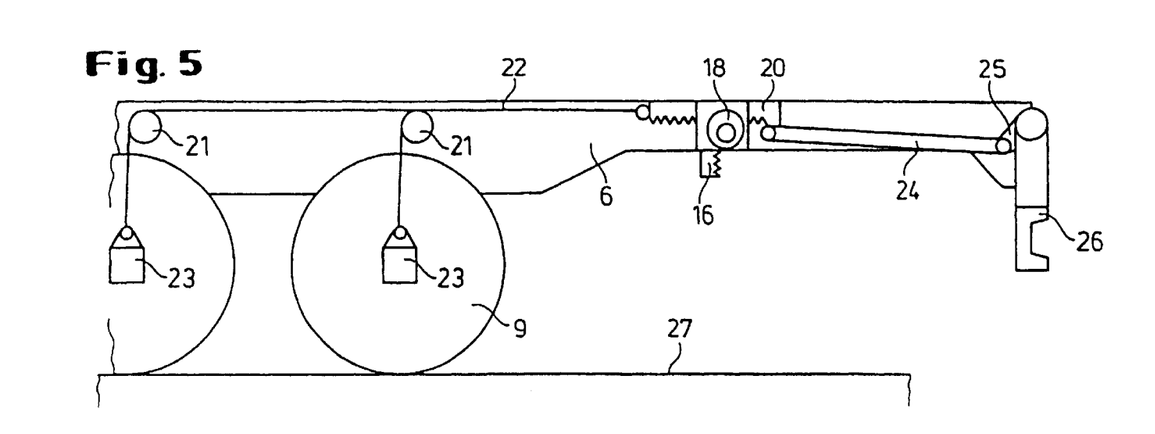
FIG. 5 shows the rear of a set-down semitrailer.
Figure 6:
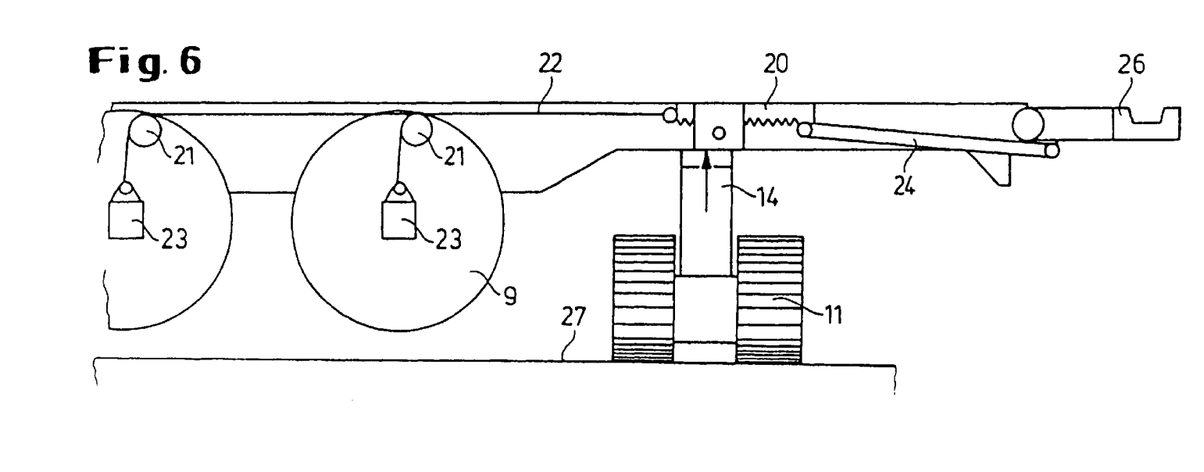
FIG. 6 shows the rear of the trailer from FIG. 3 together with the associated crawler undercarriage.

When the vertical toothed rack 16 moves upward, the horizontal push rod 20 is displaced to the right to an extent corresponding to the transmission of the double pinion 18 and thus secures the trailer axles against lowering, so that the wheels 8 come away from the ground and at the same time the underride guard 26 is swung into the horizontal, as represented in FIGS. 5 and 6. The swinging up of the underride guard 26 prevents it from hitting the rear upsweep 2, or a supporting plate located there, during the loading/unloading of the semitrailer 7, while the securing of the wheel axles is a prerequisite for transverse moving of the semitrailer 7 during loading/unloading; this is because, without raising of the semitrailer 7 with the aid of the lifting bars 14 and their pins 15, the wheels 8 would otherwise stay in contact with the ground, so that transverse moving of the crawler undercarriages 11 onto the crawler standing areas 10, on the same level as the ramp 27, would not be possible.

The cable line 22 may also be substituted by a horizontally movable linkage, which grips with hooks under the wheel axles and secures them against lowering.

As soon as the mountings or undercarriages 11 with the semitrailer 7 have reached their standing areas 10 on the freight car, the lifting bar 14 lowers the trailer 7, until the wheels 8 of the latter reach the bottom of the recess 9, the lifting bar 14 comes free from the frame of the trailer 7 and the king pin 6 enters the pin receptacle 5 in the supporting plate 4. The semitrailer then rests via the supporting plate 4 and its wheels 8 fully on the frame 1 of the freight car, while the mountings 11 are relieved and then only need to be arrested on the frame.

During the loading/unloading of a wheelless body, which is used in road transport with an interchangeable undercarriage and the interchangeable undercarriage of which remains on the loading road, the body is set down on the two upsweeps 2 or on supporting plates located there.

To compensate for tolerances and thermal expansions in the longitudinal direction of the semitrailer 7, the centering pin 15 may also be mounted in such a way that it can be displaced transversely with respect to the lifting-bar 14.

Figure 8:
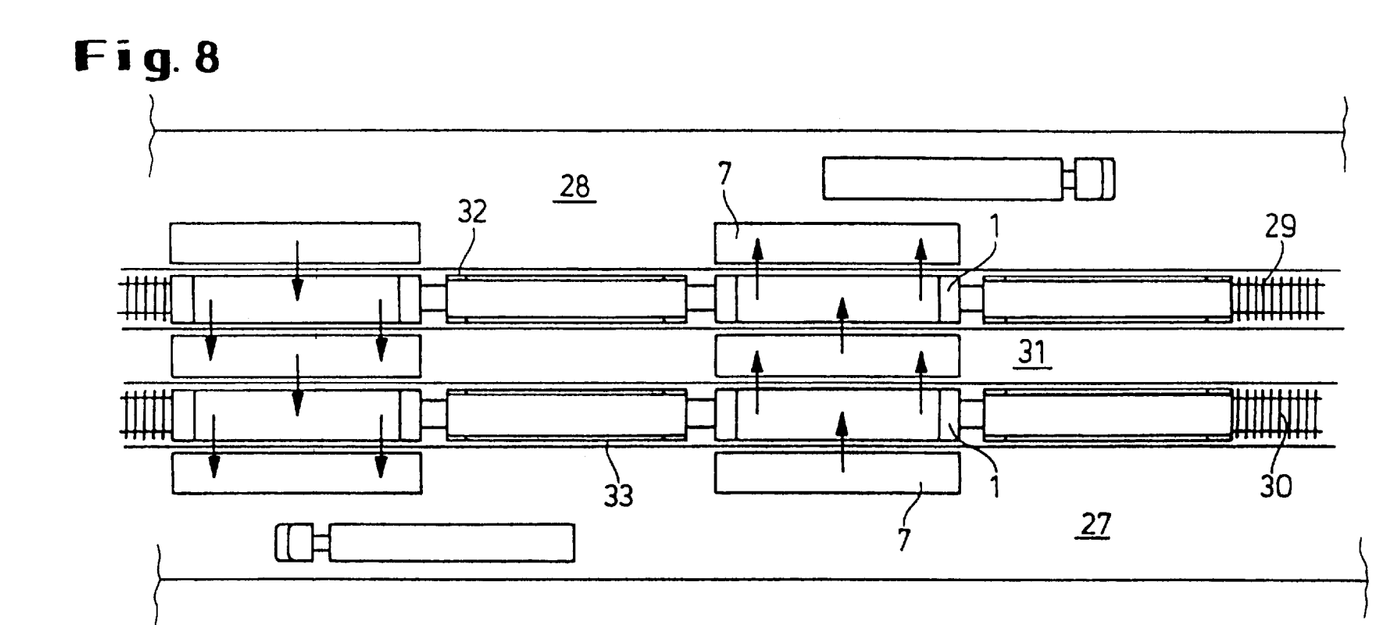
FIG. 8 shows a plan view of a terminal with two ramps arranged on either side of the tracks and transshipment operations on both sides.

The recess 9 extends into the region of the standing area 10 of the front mounting 11 and is bounded on either side by a longitudinal member 36 in each case, If, in a way corresponding to the representation in FIG. 8, a terminal has two loading roads 27, 28, on either side of two tracks 29, 30, and a central ramp 31, there is the possibility of firstly unloading a semitrailer 7 from the freight car of a freight train 32 to one side with the aid of the self-propelled mountings 11 and setting it down on the loading road 28. The mountings then move back over the frame 1 of the unloaded drop-bed freight car of the train 32 into the position for taking over the semitrailer 7 previously set down from the freight train 33 on the central ramp 31 and finally bring said semitrailer into its transporting position on the drop-bed freight car of the freight train 32. The self-propelled mountings 11 of the freight car of a freight train 33 then travel to the takeover position under the semitrailer 7 set down on the, loading road 27 and bring said semitrailer to the place which has previously become free on the freight car of the freight train 33.

Figure 9:
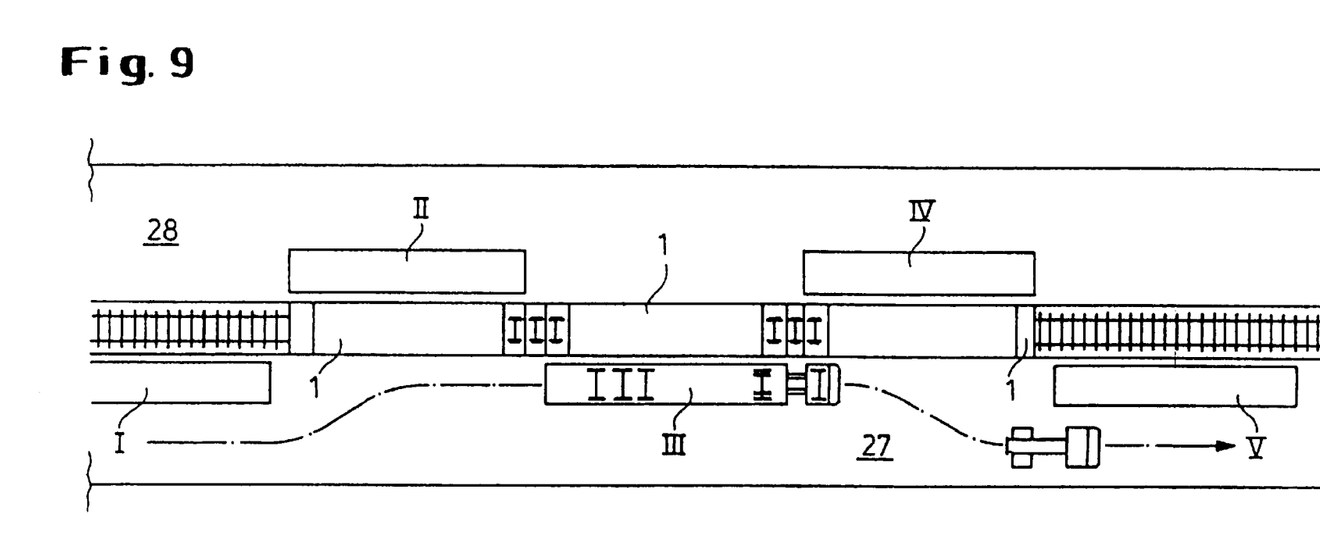
FIG. 9 shows a plan view of a terminal for the alternating loading of a freight train via two ramps.

Of particular advantage with regard to the approach of the delivery vehicles is alternating loading, as illustrated by the transshipment system according to FIG. 9, in which the transporting units I to V are loaded from alternate sides. This takes place for example by alternately setting down a semitrailer I on the loading road 27, a semitrailer II on the loading road 28 and a semitrailer III on the loading road 27 etc. This brings with it the advantage that the takeover position is reached effortlessly. There is, for example, for the semitrailer III with a ramp width of 8 m a clearance of 50 m available between the two semitrailers I and V for bringing the semitrailer III into its takeover position close by the freight car receiving it. Finding the respective parking places for the semitrailers on the two loading roads 27, 28 can be facilitated by marking the parking places on one loading road with even numbers and the parking places on the other loading road with odd numbers. It is then easy for the person making the delivery to find and reach his parking place.

Figure 10:
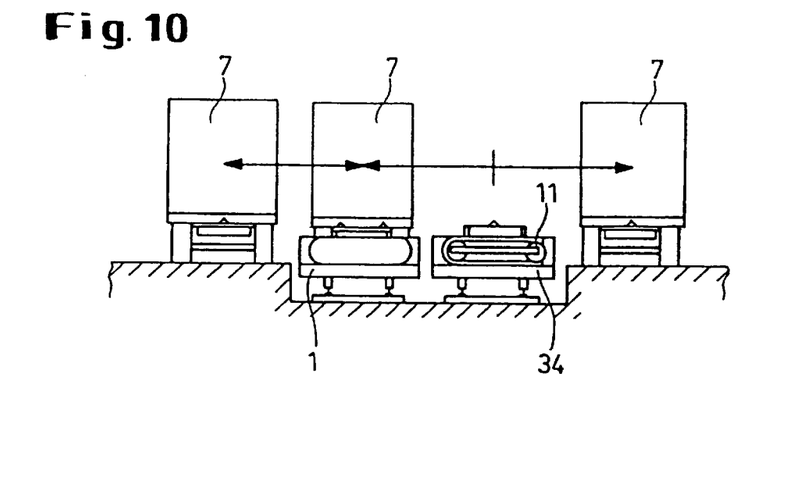
FIG. 10 shows a stationary arrangement of the mountings in a sectional representation and FIG. 11 shows a plan view of the arrangement from FIG. 10.
Figure 11:
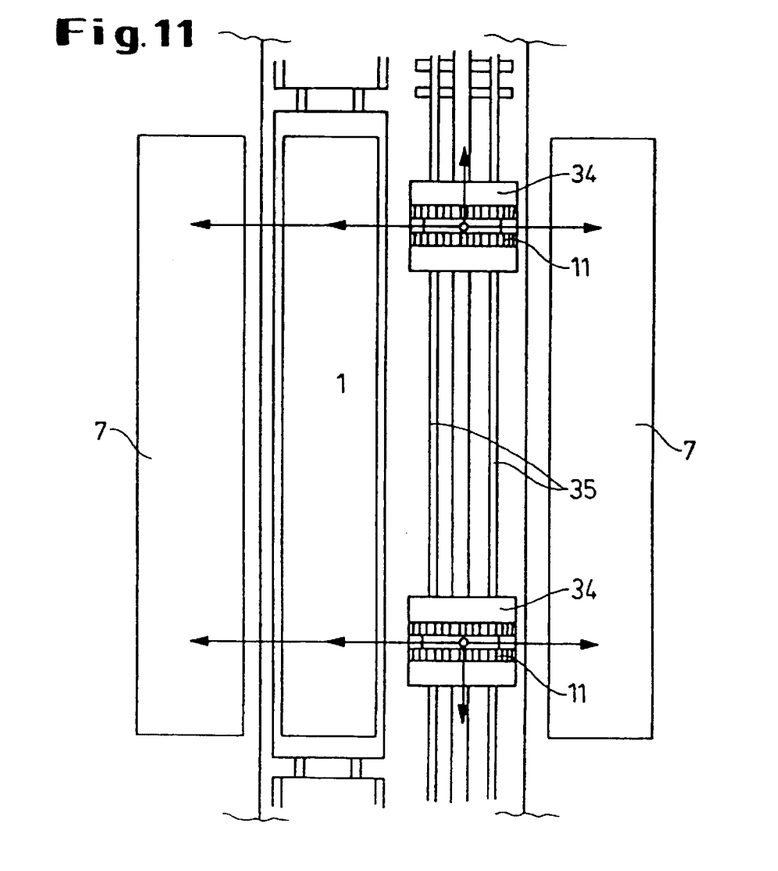

The transshipment system according to the invention can also be realized by the mountings not being on board the freight cars but in a stationary arrangement; they may then be arranged on a mounting carriage 34, which can be moved on rails 35, in order to be able with a pair of mountings to load and unload a number of freight cars. On the other hand, the mountings may also be used as such on a loading road. The number of mountings then preferably corresponds to twice the number of freight cars to be served, to make it possible for an entire freight train to be loaded and unloaded in just a few minutes. Considered overall, however, the expenditure is greater in the case of stationary mountings than in the case of onboard mountings. The use of stationary mountings however has the advantage that the loading capacity of the freight cars without mountings is increased.

Altogether, the transshipment system according to the invention has a series of commercially very significant advantages over conventional systems. In particular, it does not require expensive terminals, but generally just two loading roads without a loading/unloading crane or, if the mountings are on board the freight cars, other technical installations. Furthermore, when onboard mountings or a corresponding number of stationary mountings are used, the loading/unloading time is independent of the number of transport units to be loaded; it is only a few minutes. This allows individual transporting units to be offloaded or additionally loaded at stations along the route, without a lengthy stop or a special tractor vehicle being required for the purpose. By virtue of the short loading/unloading time, it is also possible in principle when using onboard loading means to integrate the transshipment system according to invention into a passenger train.

Industrial Applicability

The use of semitrailers, which act virtually as "pallets", is of particular advantage if they are loaded with containers or interchangeable containers.

What is claimed is:

1. A transshipment system for combined road and rail transport comprising:
   drop-bed freight cars with a frame,
   a wheel recess,
   an underrunning mounting which can be moved transverse to the longitudinal axis of the freight car, and
   a transporting unit.

2. The transshipment system as claimed in claim 1, wherein a mounting standing area is provided at the front and rear of the frame on either side of the wheel recess.

3. The transshipment system as claimed in claim 1, wherein a mounting standing area is arranged at a level of a loading/unloading ramp.

4. The transshipment system as claimed in claim 1, wherein the wheel recess is arranged between longitudinal members of the frame.

5. The transshipment system as claimed in claim 1, wherein mountings comprise an undercarriage.

6. The transshipment system as claimed in claim 1, wherein a mounting is provided with a lifting bar.

7. The transshipment system as claimed in claim 1, wherein a lifting bar is provided with a conical centering cone.

8. The transshipment system as claimed in claim 1, wherein a centering cone is mounted in such a way that the centering cone can be displaced in the direction of the longitudinal axis of the drop-bed freight car.

9. The transshipment system as claimed in claim 7, wherein there is a centering opening in the frame of the transporting unit.

10. The transshipment system as claimed in claim 9, wherein the centering opening is conically formed.

11. The transshipment system as claimed in claim 1, which comprises two mountings arranged at a distance from each other less than the length of a semitrailer.

12. The transshipment system as claimed in claim 1, wherein the frame is provided in the region of at least one upsweep with a supporting plate.

13. The transshipment system as claimed in claim 12, wherein the supporting plate is provided with a pin receptacle.

14. The transshipment system as claimed in claim 1, which comprises a locking unit for mountings on the frame of the drop-bed freight car.

15. The transshipment system as claimed in claim 1, which comprises a semitrailer with a securing device for axles and a swing-mounted underride guard.

16. The transshipment system as claimed in claim 15, wherein the securing device comprises a vertical toothed rack, a double pinion and a horizontal push rod.

17. The transshipment system as claimed in claim 16, wherein the push rod is connected on the one hand via a link to a crank of the underride guard and on the other hand via linkage to the trailer axles.

18. The transshipment system as claimed in claim 1, wherein mountings are on board the freight cars.

19. The transshipment system as claimed in claim 1, wherein mountings are in a stationary arrangement.

20. The transshipment system as claimed in claim 19, wherein mountings can be moved on rails.

* * * * *